United States Patent
Noguchi

(10) Patent No.: US 9,528,597 B2
(45) Date of Patent: Dec. 27, 2016

(54) POWER STEERING APPARATUS AND PRELOAD ADJUSTMENT METHOD THEREOF

(71) Applicant: Showa Corporation, Gyoda-shi (JP)

(72) Inventor: Satoshi Noguchi, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/751,630

(22) Filed: Jun. 26, 2015

(65) Prior Publication Data

US 2016/0185381 A1    Jun. 30, 2016

(30) Foreign Application Priority Data

Dec. 24, 2014    (JP) .................................. 2014-260205

(51) Int. Cl.
*B62D 5/04*    (2006.01)
*F16H 57/12*    (2006.01)

(52) U.S. Cl.
CPC ............. *F16H 57/12* (2013.01); *B62D 5/0409* (2013.01)

(58) Field of Classification Search
CPC .......... B62D 5/0454; F16H 2057/0213; Y10T 74/19623
See application file for complete search history.

(56) References Cited

U.S. PATENT DOCUMENTS

| 6,705,176 | B2* | 3/2004 | Ishii | ..................... B62D 5/0409 74/388 PS |
| 7,614,317 | B2* | 11/2009 | Sickert | ................... B62D 3/123 29/525.12 |
| 2003/0136211 | A1 | 7/2003 | Ishii et al. | |

FOREIGN PATENT DOCUMENTS

| JP | 2003-004105 A | 1/2003 |
| JP | 2003-301890 A | 10/2003 |
| JP | 2004-181991 A | 7/2004 |
| JP | 2007-247734 A | 9/2007 |
| JP | 2010-163029 A | 7/2010 |
| JP | 2013-208932 A | 10/2013 |

OTHER PUBLICATIONS

Search Report mailed Nov. 30, 2015 for the corresponding U.K. Application No. GB1511326.9.

* cited by examiner

*Primary Examiner* — Kevin Hurley
(74) *Attorney, Agent, or Firm* — Leason Ellis LLP

(57) ABSTRACT

A power steering apparatus includes: a worm driven by a motor for assistance; a worm wheel engaged with the worm and transmitting an assist force to a steering shaft; a housing which houses the worm and the worm wheel; a plug having a male screw on an outer peripheral surface of the plug, the male screw being screwed with a female screw formed at the housing; an elastic member, one end of which in a biasing direction of the elastic member is supported by the worm and other end of which in the biasing direction is supported by the plug, giving a preload between the worm and the worm wheel; and a plug fixing member for fixing the plug, a position of which is adjusted to a screwing position at which the preload is a predetermined value, so that the plug is unrotatable with respect to the housing.

4 Claims, 6 Drawing Sheets

POWER STEERING APPARATUS AND PRELOAD ADJUSTMENT METHOD THEREOF

CROSS-REFERENCE TO RELATED APPLICATIONS

This application is based on and claims priority under 35 USC 119 from Japanese Patent Application No. 2014-260205 filed on Dec. 24, 2014, the content of which is incorporated herein by reference.

BACKGROUND OF THE INVENTION

1. Field of the Invention

The present invention relates to a power steering apparatus and a preload adjustment method thereof.

2. Description of Related Art

In a motor-driven power steering apparatus, a rotation force of a motor for assistance generating an assist force is generally transmitted through a speed reduction mechanism to a pinion shaft and so on connected to a steering shaft through a torsion bar. The speed reduction mechanism is formed by, for example, a worm gear mechanism. In the case where the motor-driven power steering apparatus is a pinion-assist type apparatus, the speed reduction mechanism is formed by including a worm connected to an output shaft of a motor and a worm wheel fixed to the pinion shaft and engaged with the worm.

In the above motor-driven power steering apparatus, it is necessary to set a center distance between the worm and the worm wheel easily without being affected by dimension errors of parts such as the worm at the time of assembly as well as to maintain the center distance suitably to thereby eliminate backlash even when the engagement between the worm and the worm wheel is changed over time after the assembly.

In response to the above problems, there is disclosed in JP-A-2013-208932 (Patent Document 1), a power steering apparatus having a preload means for biasing a bearing supporting a distal shaft portion of the worm to a given preload direction so as to apply the preload to an engaged portion of the worm and the worm wheel. The preload means is formed by a compression coil spring. The center distance between the worm and the worm wheel is suitably maintained by an elastic force of the preload means to prevent a backlash.

The preload means described in Patent Document 1 includes a bearing case which is a C-shaped annular body in which part in a circumferential direction is cut out. An inner circumferential surface of the bearing case is formed as a bearing housing hole in which a guide surface for guiding the bearing to the preload direction is formed. One end of a compression coil spring abuts on the bearing through a spring insertion hole formed in the bearing case and the other thereof abuts on a lid fixed on a lid attachment surface of a housing. The lid is fixed to the lid attachment surface of the housing by a bolt.

A biasing force of the compression coil spring depends on a compression amount of the spring. The compression amount depends on a distance between a position of the worm and the lid attachment surface, a free length of the spring and the like. However, variation may occur in the distance between the position of the worm and the lid attachment surface, the free length of the spring and the like due to manufacturing errors, assembly errors and so on. Therefore, variation may occur in the biasing force of the compression coil spring and variation may occur in the preload between the worm and the worm wheel due to the above variation.

SUMMARY OF THE INVENTION

The present invention has been made for solving the above problems, and an object thereof is to provide a power steering apparatus and a load adjustment method thereof capable of adjusting the preload between the worm and the worm wheel to a desired value regardless of manufacturing errors, assembly errors and so on.

According to an embodiment of the present invention, there is provided a power steering apparatus having: a worm driven by a motor for assistance; a worm wheel engaged with the worm and transmitting an assist force to a steering shaft; a housing which houses the worm and the worm wheel; a plug having a male screw on an outer peripheral surface of the plug, the male screw being screwed with a female screw formed at the housing; an elastic member, one end of which in a biasing direction of the elastic member is supported by the worm and other end of which in the biasing direction is supported by the plug, giving a preload between the worm and the worm wheel; and a plug fixing member for fixing the plug, a position of which is adjusted to a screwing position at which the preload is a predetermined value, so that the plug is unrotatable with respect to the housing.

Thereby, even when manufacturing errors of the elastic member, assembly errors around the worm and the worm wheel and so on exist, a desired preload can be obtained between the worm and the worm wheel by adjusting the position of the plug to the screwing position. The desired preload can be maintained by providing the plug fixing member.

In the present invention, the plug fixing member may be a lock nut screwed to the male screw of the plug.

Thereby, the plug fixing member can be realized by a simple structure, and a fixing work of the plug can be also performed easily.

In the present invention, the plug fixing member may be caulking between the plug and the housing.

Thereby, the plug fixing member can be realized by a simple structure, and the fixing work of the plug can be also performed easily.

The power steering apparatus according to the embodiment may further include a gauge-head insertion hole formed at the housing, which is for inserting, from an outside of the housing, a gauge head for measuring a load of the worm with regard to the preload and a closing member which closes the gauge-head insertion hole.

Thereby, the preload between the worm and the worm wheel can be adjusted easily by a simple structure in which the hole is formed at the housing and the closing member which closes the hole is provided.

Also according to the present invention, there is provided a preload adjustment method of a power steering apparatus having a worm driven by a motor for assistance, a worm wheel engaged with the worm and transmitting an assist force to a steering shaft, a housing which houses the worm and the worm wheel, a plug having a male screw on an outer peripheral surface of the plug, the male screw being screwed with a female screw formed at the housing, and an elastic member, one end of which in a biasing direction of the elastic member is supported by the worm and other end of which in the biasing direction is supported by the plug, giving a preload between the worm and the worm wheel, which includes the steps of adjusting a position of the plug to a screwing position at which the preload is a predetermined value and fixing the plug, the position of which is adjusted in the adjusting of a position of the plug, so that the plug is unrotatable with respect to the housing.

Thereby, even when manufacturing errors of the elastic member, assembly errors around the worm and the worm wheel and so on exist, a desired preload can be obtained between the worm and the worm wheel by adjusting the position of the plug to the screwing position. The desired preload can be maintained by providing the plug fixing member.

In the present invention, a gauge-head insertion hole may be formed at the housing, and in the plug adjustment process, it is preferable that a load of the worm with regard to the preload is measured in a state where the gauge head of a load meter is inserted into the housing through the gauge-head insertion hole and the worm is driven by the motor for assistance to decide a screwing position of the plug from the measured load and that the gauge-head insertion hole is closed after the measuring.

Thereby, the preload between the worm and the worm wheel can be adjusted easily by a simple structure in which the hole is formed at the housing and the closing member which closes the hole is provided.

By applying the present invention, it is possible to adjust the preload between the worm and the worm wheel to a desired value regardless of manufacturing errors, assembly errors and so on.

BRIEF DESCRIPTION OF THE DRAWINGS

FIG. 3A is a perspective view and FIG. 3B is a front view;

DETAILED DESCRIPTION OF THE INVENTION

First Embodiment

Structure of Motor-Driven Power Steering Apparatus

Figure 1:
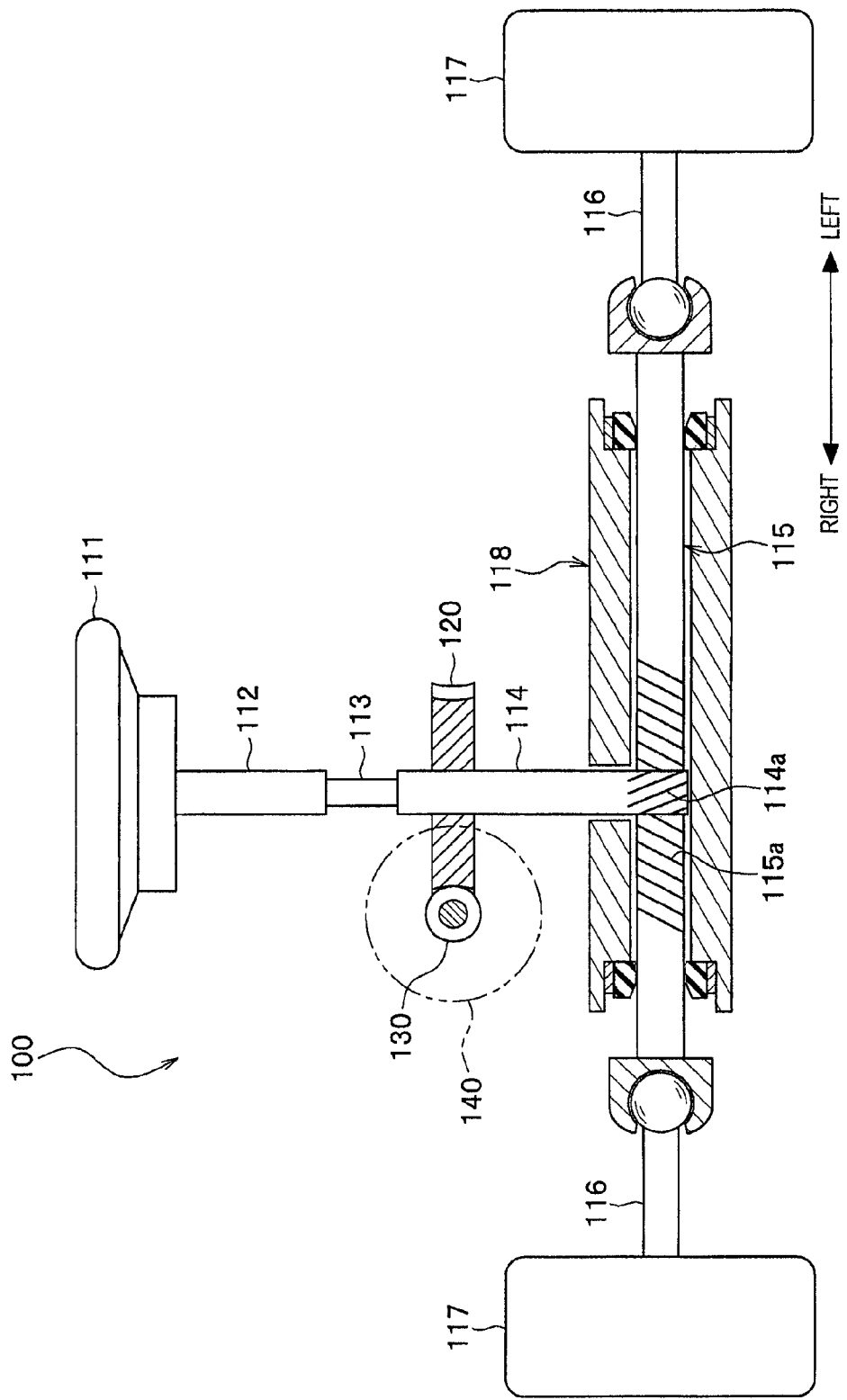
FIG. 1 is a view showing a structure of a motor-driven power steering apparatus.

In FIG. 1, a motor-driven power steering apparatus 100 (steering apparatus) is a pinion assist type apparatus in which an assist force is inputted to a pinion shaft 114. However, the present invention can be also applied to a column-assist type and a rack-assist type motor-driven power steering apparatuses.

A motor-driven power steering apparatus 100 includes a steering wheel 111 operated by a driver, a steering shaft 112 rotating together with the steering wheel 111, a torsion bar 113 connected to a lower end of the steering shaft 112, a pinion shaft 114 connected to a lower end of the torsion bar 113 and a rack shaft 115 extending in a vehicle width direction (right and left direction).

Pinion teeth 114a of the pinion shaft 114 are meshed with rack teeth 115a of the rack shaft 115. Then, when the pinion shaft 114 rotates around a rotation axis O1 (see FIG. 2), the rack shaft 115 moves in the vehicle width direction and steered wheels 117 (vehicle wheels) connected through tie rods 116 are steered. The rack shaft 115 is housed in a cylindrical housing 118 through a bush and the like.

The motor-driven power steering apparatus 100 also includes a worm wheel 120 coaxially fixed to the pinion shaft 114, a worm 130 engaged with the worm wheel 120, an electric motor for assistance (hereinafter referred to as merely a motor) 140 generating an assist force and rotating the worm 130, a joint 150 connecting an output shaft 141 of the motor 140 to the worm 130 and a housing 20 housing the worm 130 and so on (see FIG. 2)

[Worm Wheel]

The worm wheel 120 is serration-connected with the pinion shaft 114. That is, the worm wheel 120 is rotatably attached to the pinion axis 114 in a coaxial manner. The worm wheel 120 is engaged with the worm 130 to transmit the assist force of the motor 140 to the steered shaft (rack shaft 115).

[Worm]

Figure 2:
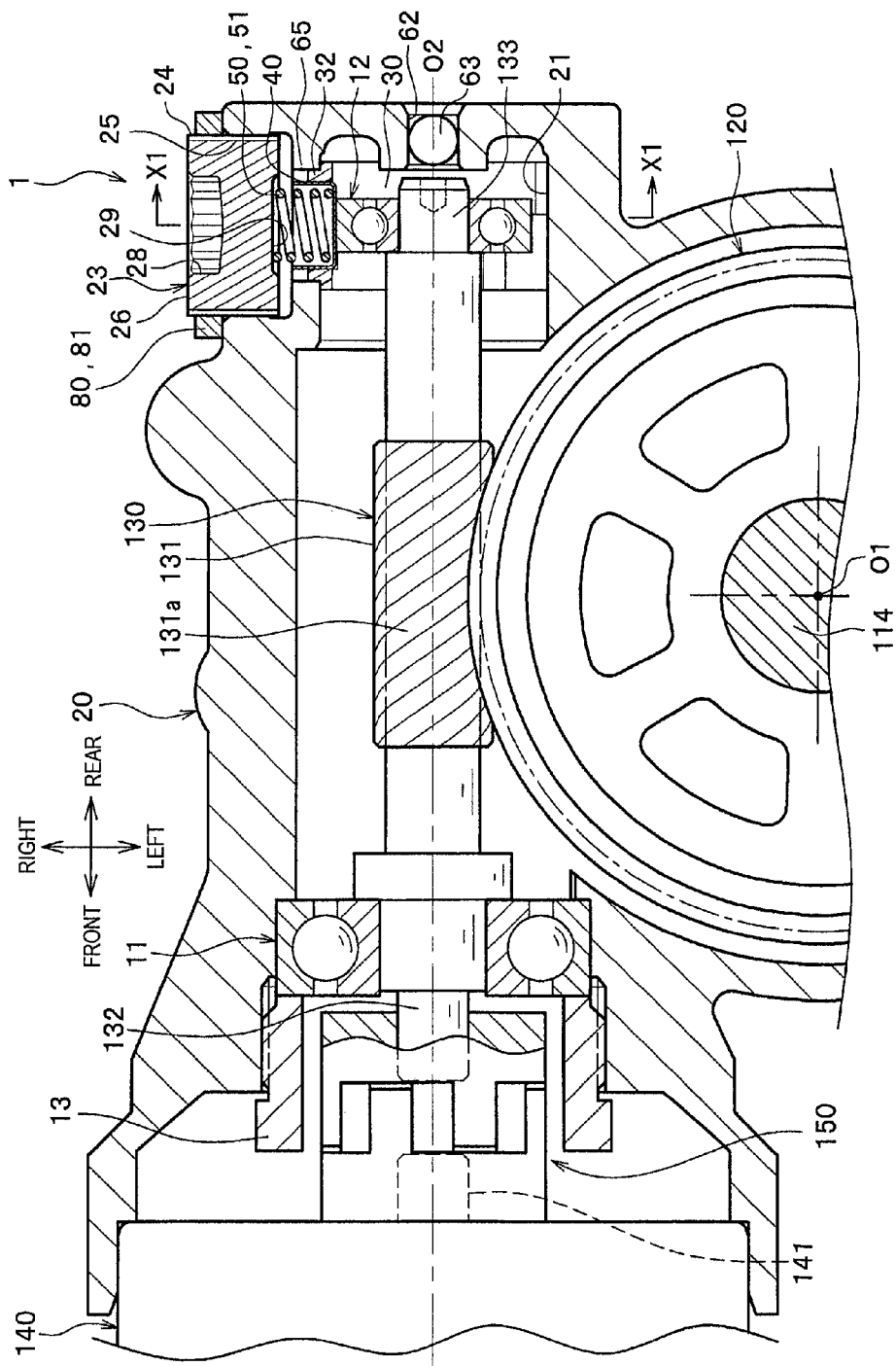
FIG. 2 is a cross-sectional plan view around a worm and a worm wheel.

As shown in FIG. 2, the worm wheel 130 is a part having an approximately columnar shape rotating around a rotation axis O2, which has a worm body 131 in which gear teeth 131a are formed on a peripheral surface, a first shaft portion 132 formed on one end side (motor 140 side) of the worm body 131 and a second shaft portion 133 formed on the other end side (opposite side of the motor 140) of the worm body 131.

The first shaft portion 132 is rotatably supported by the housing 20 through a first bearing 11. The second shaft portion 133 is rotatably supported by the housing 20 through a second bearing 12 and a holder 30.

When the motor 140 is driven and the worm 130 is rotated, the gear teeth 131a of the worm 130 are going to climb over wheel teeth formed in an outer peripheral surface of the worm wheel 120. That is, a separating force to separate from the worm wheel 120 is generated at the worm 130.

[Motor]

The motor 140 is an electric motor driven in accordance with an instruction by a not-shown ECU (Electronic Control Unit) and generating the assist force. The output shaft 141 of the motor 140 is connected to the first shaft portion 132 of the worm 130 through the joint 150. The ECU detects a torsional torque generated in the torsion bar 113 (FIG. 1) through a torque sensor (not shown), and drives the motor 140 so as to correspond to the magnitude of the torsional torque to thereby generate the assist force.

[Joint]

The joint 150 connects between the output shaft 141 and the first shaft portion 132 to transmit the power of the motor 140 to the worm 130.

[First Bearing]

The first bearing 11 is provided between the first shaft portion 132 of the worm 130 and the housing 20, rotatably supporting the first shaft portion 132 with respect to the housing 20. The first bearing 11 is formed by, for example, a radial ball bearing, supporting a load in a radial direction. The first bearing 11 is held by the housing 20 by a cylindrical stopper member 13 screwed to the housing 20.

[Second Bearing]

The second bearing 12 is provided between the second shaft portion 133 of the worm 130 and the housing 20, rotatably supporting the second shaft portion 133 with respect to the housing 20. The second bearing 12 is formed by, for example, a radial ball bearing, supporting a load in a radial direction. The second bearing 12 is housed in a later-described holder 30.

[Housing]

The housing 20 houses the worm wheel 120, the worm 130 and the like. In the housing 20, a holder housing hole 21 for housing the holder 30 is formed. The holder housing hole 21 has a short columnar shape, and an axial direction thereof extends in an axial direction of the worm 130. The holder housing hole 21 is communicated with the outside through a communication hole 22 extending in a later-described biasing direction (a radial direction of the worm 130 (separating direction)). The communication hole 22 is closed by a plug 23. At the housing 20, a female screw 25 to which a male screw 24 of the plug 23 is screwed is formed.

At the housing 20, a gauge-head insertion hole 62 into which a gauge head 61 of a load meter 60 (FIG. 5) which measures a load concerning the preload of the worm 130 is inserted from the outside is formed as described later. The gauge-head insertion hole 62 is formed in a position facing an end portion of the second shaft portion 133 approximately around the rotation axis O2 as a hole axis center. The gauge-head insertion hole 62 is closed by a closing member 63 after the measurement by the load meter 60. The closing member 63 is formed by, for example, a metal ball such as a steel ball, which closes the gauge-head insertion hole 62 by press fitting. The closing member 63 may be formed by members other than the metal ball. The closing member 63 may be provided so as to be detachable.

[Worm Biasing Structure]

Figure 4:
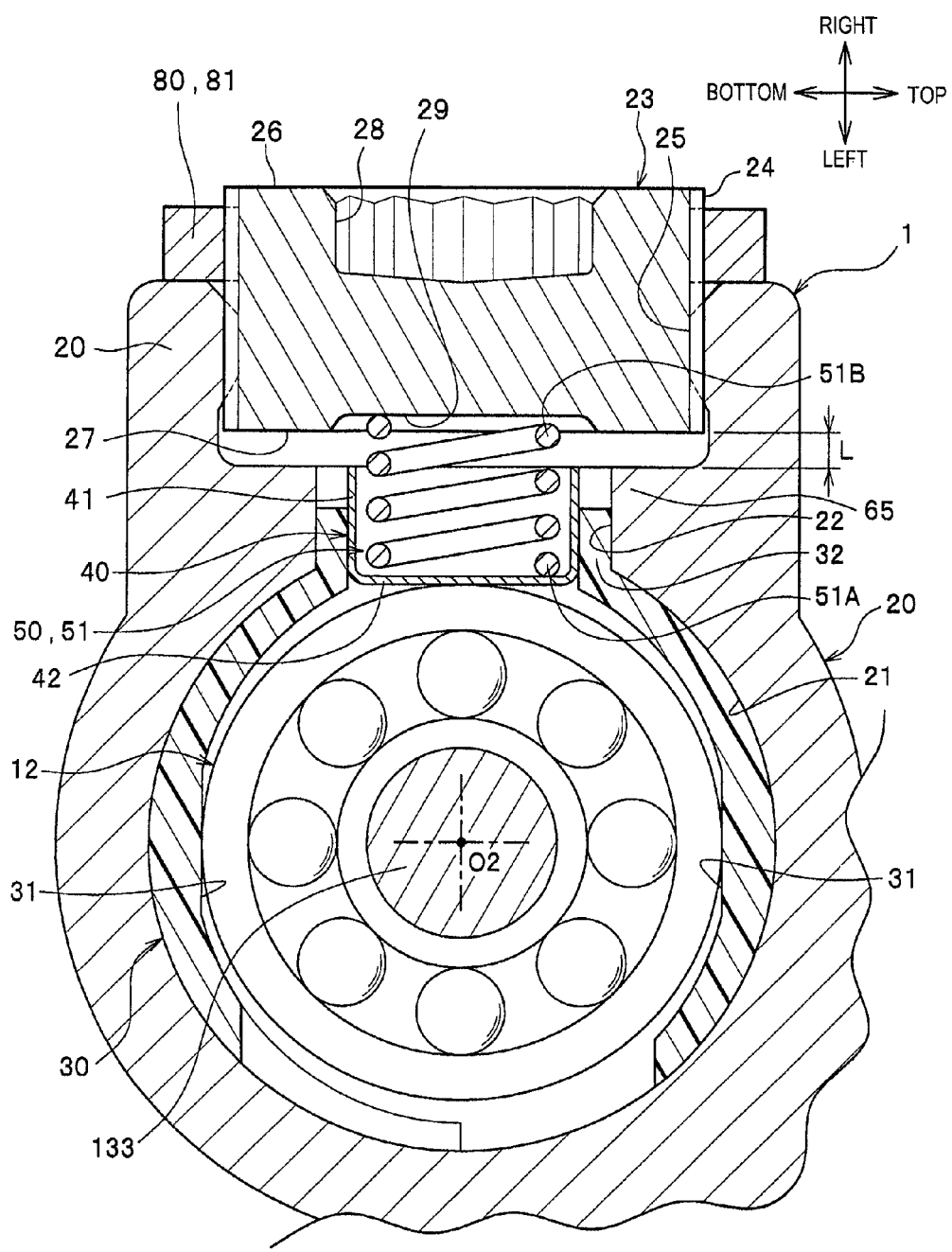
FIG. 4 is a cross-sectional view taken along X1-X1 of FIG. 2.

The motor-driven power steering apparatus 100 includes a worm biasing structure 1 which biases the second bearing 12 (worm 130) toward the worm wheel 120 to give a preload to the worm 130. The worm biasing structure 1 is formed by including the second bearing 12, the holder 30, a cup 40 and an elastic member 50 as shown in FIG. 4. In this case, the biasing direction in which the second bearing 12 (worm 130) is biased is a right and left direction (vertical direction of the page) in FIG. 4, namely, a radial direction of the worm 130.

[Holder]

Figure 3A:
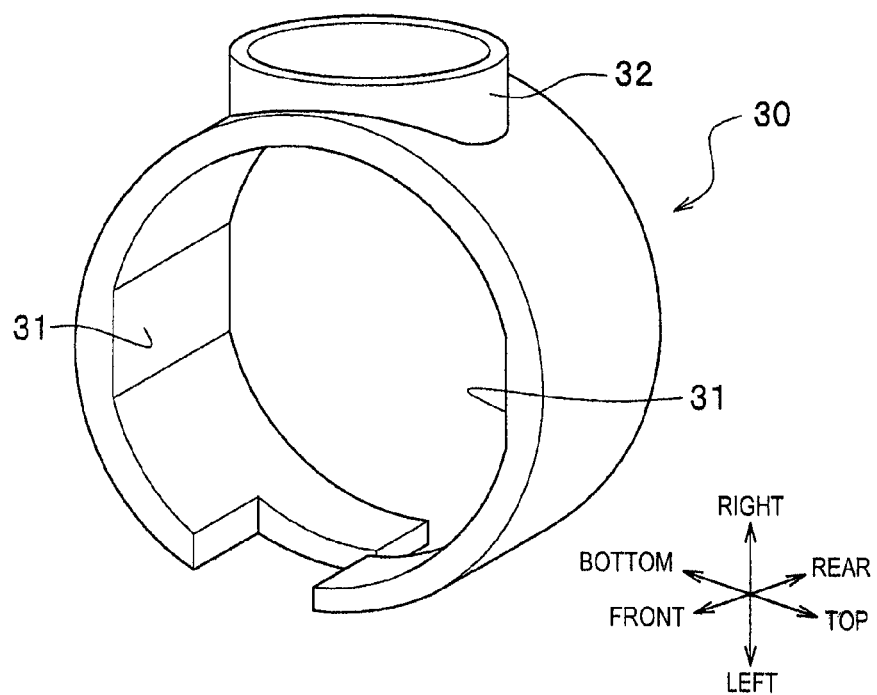
FIGS. 3A and 3B are explanation views of a holder.
Figure 3B:
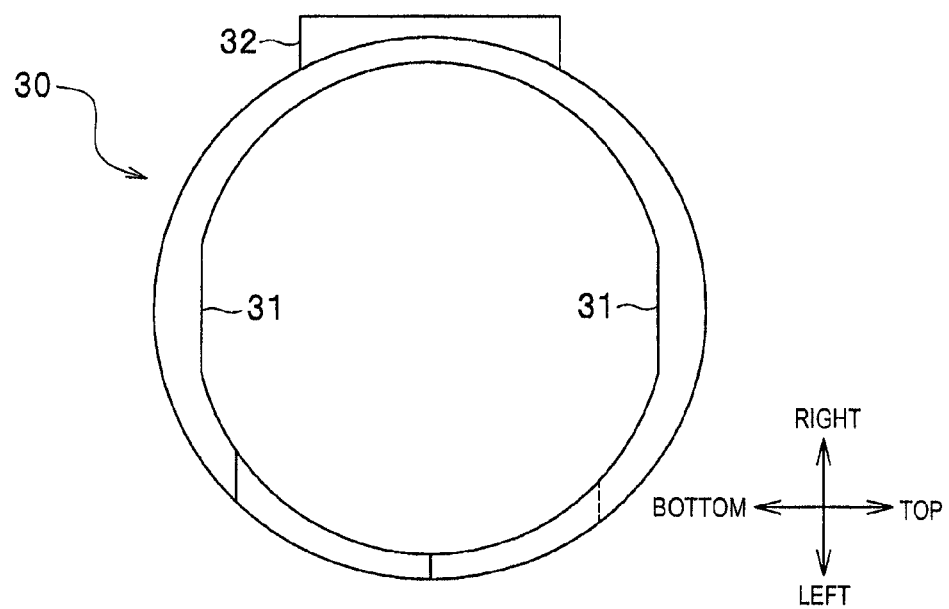

The holder 30 is a member having an approximately annular shape and covering the outside of the second bearing 12 to hold the second bearing 12 as shown in FIGS. 3A, 3B and FIG. 4. The holder 30 has a C-shape in which a portion facing the worm wheel 120 is cut out seen from the axial direction of the second bearing 12. Then, the holder 30 is housed inside the holder housing hole 21 in a state of being slightly reduced in diameter.

In an inner peripheral surface of the holder 30, a pair of flat guide surfaces 31, 31 extending in the biasing direction (right and left direction) of the worm 130 are formed. That is, the second bearing 12 can slide in the biasing direction of the worm 130 while slidingly contacting the guide surfaces 31, 31.

A short-cylindrical shaped spring housing portion 32 is formed in the holder 30 on the opposite side of the worm wheel 120. The spring holding portion 32 is a portion which houses a compression coil spring 50 and a hollow portion thereof extends in the biasing direction (right and left direction) of the worm 130.

[Cup]

The cup 40 has a bottomed cylindrical shape in which the second bearing 12 side is closed, which is housed in the spring housing portion 32 so as to be slidable. The cup 40 includes a cylindrical peripheral wall portion 41 and a bottom wall portion 42 formed in the peripheral wall portion 41 side of the second bearing 12. The peripheral wall portion 41 has a certain degree of length in the sliding direction of the cup 40 and an outer peripheral surface of the peripheral wall portion 41 slidingly contacts an inner peripheral surface of the spring housing portion 32. An outer surface of the bottom wall portion 42 linearly contacts an outer peripheral surface of the second bearing 12.

[Elastic Member]

The elastic member 50 is an elastic body which biases the second bearing 12 (worm 130) toward the worm wheel 120. In the present embodiment, the elastic member 50 is formed by the compression coil spring 51. The compression coil spring 51 is arranged in a compressed state so as to extend along the biasing direction inside the spring housing portion 32, and one end 51A thereof abuts on the bottom wall portion 42 of the cup 40 and the other end 51B thereof abuts on the plug 23. That is, in the compression coil spring 51, one end 51A is supported by the worm 130 through the cup 40 and the second bearing 12 in the biasing direction and the other end 51B is supported by the plug 23. Accordingly, a preload is given between the worm 130 and the worm wheel 120 due to an elastic restoring force of the compression coil spring 51. The elastic member 50 may be a disc spring, a rubber material and so on.

[Plug]

The motor-driven power steering apparatus 100 includes the plug 23 having the male screw 24 on an outer peripheral surface, the male screw 24 being screwed with the female screw 25 of the housing 20. The plug 23 is a short-columnar member formed in an approximately fixed diameter in the axial length. On an end surface (referred to as an outer end surface 26) on one end side of the plug 23 in the axial direction, a hexagonal hole 28 into which a screw fastening tool 71 (FIG. 5) is inserted is formed. On an end surface (referred to as an inner end surface 27) on the other end side of the plug 23 in the axial direction, a concave portion 29 for housing the other end 51B of the compression coil spring 51 is formed.

[Plug Fixing Member]

The motor-driven power steering apparatus 100 includes a plug fixing member 80 which fixes the plug 23 the position of which is adjusted to an arbitrary screwing position so as not to rotate with respect to the housing 20 for obtaining a desired preload between the worm 130 and the worm wheel 120. As a preferred example of the plug fixing member 80, a lock nut (locking nut) 81 can be cited. In this case, in the plug 23 the position of which is adjusted at the position where the desired preload is obtained, part of the male screw 24 is exposed to the outside from the outer surface of the housing 20. The rock nut 81 is screwed to the exposed male screw 24 so as to abut on the outer surface of the housing 20. Accordingly, the plug 23 is fixed to the housing 20 so as not to rotate and the movement of the plug 23 in the axial direction is inhibited. As the lock nut 81, a lock nut of a well-known structure can be used and explanation of the detailed structure is omitted.

[Procedures of Preload Adjustment]

Figure 5:
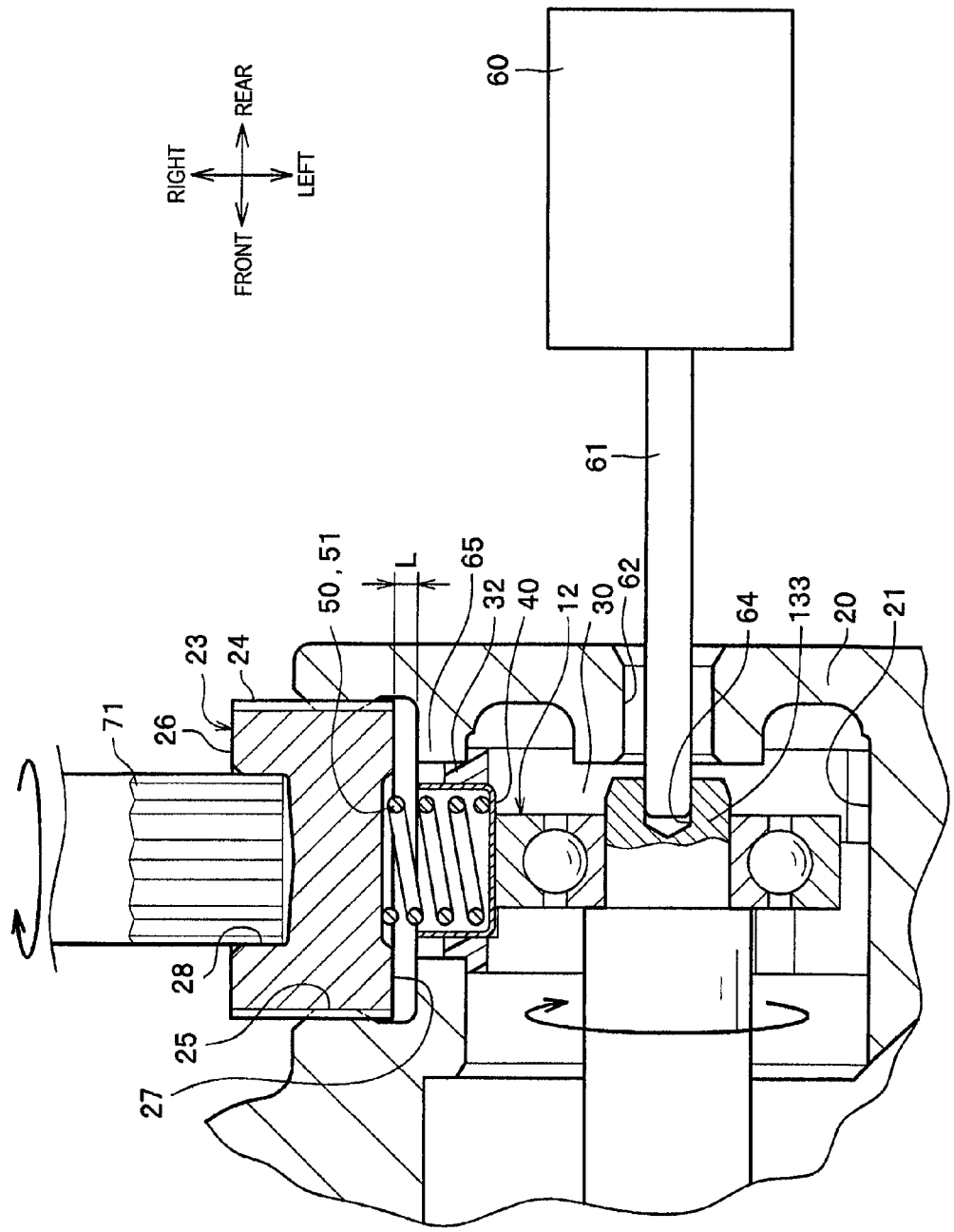
FIG. 5 is a view showing a preload adjustment method, which is a cross-sectional plan view around an elastic member.

In a state where all the respective parts inside the housing 20 are assembled, the gauge-head insertion hole 62 (FIG. 2) is left unclosed. Then, as shown in FIG. 5, the screw fastening tool 71 is inserted into the hexagonal hole 28 and the male screw 24 of the plug 23 is screwed with the female screw 25 of the housing 20 to compress the compression coil spring 51. The elastic restoring force generated in the compressed coil spring 51 is acted as a force of pressing the second bearing 12 to the worm wheel 120 side inside the holder 30. Accordingly, the preload is given between the worm 130 and the worm wheel 120. After that, a plug adjustment process and a plug fixing process are performed described below.

[Plug Adjustment Process]

In the plug adjustment process, the position of the plug 23 is adjusted to an arbitrary screwing position for obtaining a desired preload. An example of a method of determining whether the desired preload can be obtained or not is as follows. The gauge head 61 of the load meter 60 is inserted into the housing 20 through the gauge-head insertion hole 62 and a tip thereof is locked in a gauge-head locking hole 64 formed on an end surface of the second shaft portion 133. The load concerning the preload of the worm 130 is measured in the state where the worm 130 is driven by the motor 140, and the screwing position of the plug 23 is adjusted by the screw fastening tool 71 and the compression amount of the compression coil spring 51 is adjusted so that the measurement value reaches a "predetermined load". A value of the "predetermined load" is a load value when the desired preload is obtained, which is an approximately value obtained by subtracting the separating force of the worm 130 separating from the worm wheel 120 which is generated when the worm 130 is rotated as described above from the preload obtained when the worm 130 is not rotated. The value of the "predetermined load" is a value calculated by simulations and the like in advance.

When the measured value of the load member 60 becomes the predetermined load, the plug 23 is in the state where part of the male screw 24 is exposed to the outside from the outer surface of the housing 20. A gap L is formed between the inner end surface 27 of the plug 23 and a wall portion 65 of the housing 20 in which the communication hole 22 is formed. After that, the gauge-head insertion hole 62 is closed by the closing member 63.

[Plug Fixing Process]

In the plug fixing process, the plug 23 the position of which is adjusted in the plug adjustment process is fixed by the lock nut 81 so as not to rotate with respect to the housing 20. Accordingly, the movement of the plug 23 in the axial direction is inhibited, and the preload between the worm 130 and the worm wheel 120 is held in a suitable value.

As described above, when applying the structure of including the plug fixing member 80 which fixes the plug 23 the position of which is adjusted to the arbitrary screwing position for obtaining the desired preload between the worm 130 and the worm wheel 120 so as not to rotate with respect to the housing 20, the desired preload can be obtained by adjusting the position of the plug 23 to the arbitrary screwing position even when there are variations in length of the compression coil spring 51, assembly errors around the worm 130 and the worm wheel 120 and so on. As the plug fixing member 80 is provided, the predetermined preload is maintained.

As the plug fixing member 80 is formed by the lock nut 81 screwed to the male screw 24 of the plug 23, the plug fixing member 80 can be realized by a simple structure and a fixing work of the plug 23 can be also performed easily.

Also, when applying a structure in which the gauge-head insertion hole 62 formed at the housing 20, into which the gauge head 61 for measuring the load concerning the preload of the worm 130 is inserted from the outside and the closing member 63 closing the gauge-head insertion hole 62, the preload adjustment between the worm 130 and the worm wheel 120 can be easily performed by a simple structure in which the hole is formed at the housing 20 and the closing member 63 for closing the hole is provided.

Second Embodiment

A second embodiment will be explained with reference to FIGS. 6A and 6B. The second embodiment is an embodiment in which the plug fixing member 80 is formed by caulking between the plug 23 and the housing 20. As the other components are the same as those of the first embodiment, the explanation thereof is omitted.

Figure 6A:
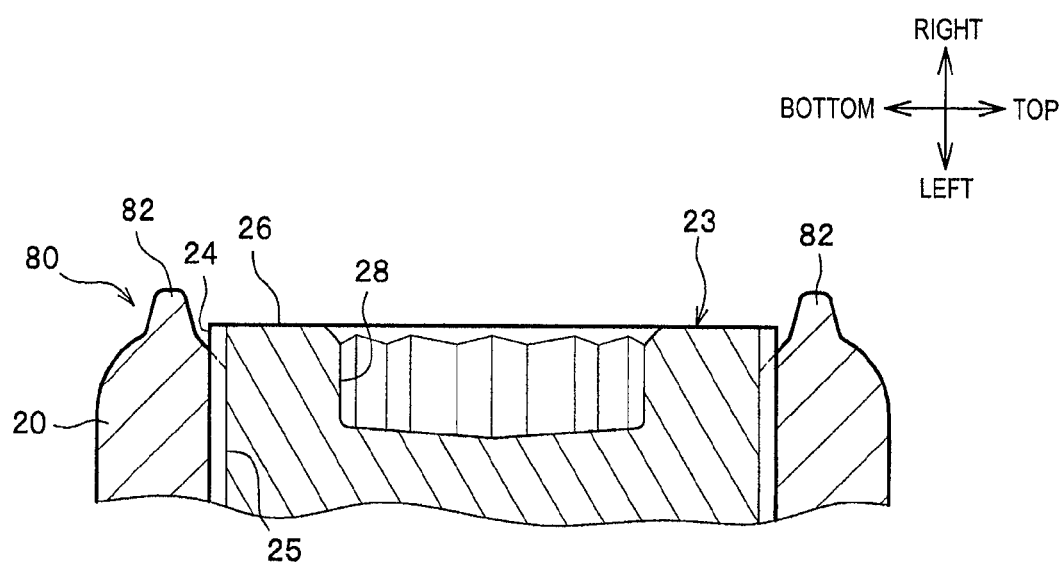
FIGS. 6A and 6B are cross-sectional plan views around a plug when a plug fixing member is a caulking structure.
Figure 6B:
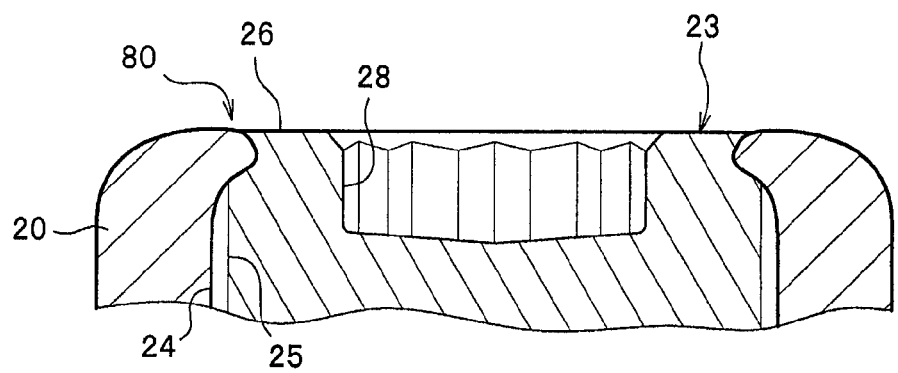

On an outer surface of the housing 20 around the female screw 25, protrusions 82 for caulking are formed so as to protrude as shown in FIG. 6A. Plural protrusions 82 may be provided at intervals in a circumferential direction of the female screw 25 as well as one protrusion 82 may be provided. In the plug 23 of the present embodiment in which the position is adjusted so as to obtain the desired preload between the worm 130 and the worm wheel 120, the outer end surface 26 is approximately flush with the outer surface of the housing 20. When the protrusions 82 are bent to the inner diameter side by using a not-shown jig, the protrusions 82 bite into the plug 23 by deforming the male screw 24 as shown in FIG. 6B. Accordingly, the plug 23 is fixed so as not to rotate with respect to the housing 20, and the movement of the plug 23 in the axial direction is inhibited.

As the plug fixing member 80 is formed by caulking between the plug 23 and the housing 20, the plug fixing member 80 can be realized by a simple structure and the fixing work of the plug 23 can be also performed easily.

The two preferred embodiments have been explained as the above. The plug fixing member 80 may fix the plug 23 to the housing 20 so as not to rotate by using an adhesive in addition to the lock nut and the caulking.

What is claimed is:

1. A power steering apparatus comprising
a worm driven by a motor for assistance,
a worm wheel engaged with the worm and transmitting an assist force to a steering shaft,
a housing which houses the worm and the worm wheel,
a plug having a male screw on an outer peripheral surface of the plug, the male screw being screwed with a female screw formed at the housing,
an elastic member, one end of which in a biasing direction of the elastic member is supported by the worm and other end of which in the biasing direction is supported by the plug, giving a preload between the worm and the worm wheel,
a plug fixing member for fixing the plug, a position of which is adjusted to a screwing position at which the preload is a predetermined value, so that the plug is unrotatable with respect to the housing,
a gauge-head insertion hole formed at the housing, which is for inserting, from an outside of the housing, a gauge head for measuring a load of the worm with regard to the preload; and
a closing member which closes the gauge-head insertion hole.

2. The power steering apparatus according to claim 1, wherein the plug fixing member is a lock nut screwed to the male screw of the plug.

3. The power steering apparatus according to claim 1, wherein the plug fixing member is caulking between the plug and the housing.

4. A preload adjustment method of a power steering apparatus comprising a worm driven by a motor for assistance, a worm wheel engaged with the worm and transmitting an assist force to a steering shaft, a housing which houses the worm and the worm wheel, a plug having a male screw on an outer peripheral surface of the plug, the male screw being screwed with a female screw formed at the housing, and an elastic member, one end of which in a biasing direction of the elastic member is supported by the worm and other end of which in the biasing direction is supported by the plug, giving a preload between the worm and the worm wheel, the method comprising:

- adjusting a position of the plug to a screwing position at which the preload is a predetermined value; and
- fixing the plug, the position of which is adjusted in the adjusting, so that the plug is unrotatable with respect to the housing,
- wherein a gauge-head insertion hole is formed at the housing, and
- in the adjusting of a position of the plug, a load of the worm with regard to the preload is measured in a state where a gauge head of a load meter is inserted into the housing through the gauge-head insertion hole and the worm is driven by the motor for assistance to decide a screwing position of the plug from the measured load, and the gauge-head insertion hole is closed after the measuring.

* * * * *